United States Patent
Bikkina

(10) Patent No.: US 11,236,956 B2
(45) Date of Patent: Feb. 1, 2022

(54) METHOD FOR IMPROVING CRITICAL HEAT FLUX

(71) Applicant: THE BOARD OF REGENTS FOR THE OKLAHOMA AGRICULTURAL AND MECHANICAL COLLEGES, Stillwater, OK (US)

(72) Inventor: Prem Kumar Bikkina, Stillwater, OK (US)

(73) Assignee: The Board of Regents for the Oklahoma Agricultural and Mechanical Colleges, Stillwater, OK (US)

( * ) Notice: Subject to any disclaimer, the term of this patent is extended or adjusted under 35 U.S.C. 154(b) by 209 days.

(21) Appl. No.: 16/653,287

(22) Filed: Oct. 15, 2019

(65) Prior Publication Data
US 2020/0124361 A1 Apr. 23, 2020

Related U.S. Application Data

(60) Provisional application No. 62/746,801, filed on Oct. 17, 2018.

(51) Int. Cl.
*F28F 1/20* (2006.01)
*F28F 13/18* (2006.01)
*F28F 13/06* (2006.01)
*F28F 3/02* (2006.01)

(52) U.S. Cl.
CPC .............. *F28F 13/187* (2013.01); *F28F 3/02* (2013.01); *F28F 13/06* (2013.01); *F28F 2260/02* (2013.01)

(58) Field of Classification Search
CPC .. F28F 13/187; F28F 3/02; F28F 13/06; F28F 2260/02
USPC ......................................................... 165/181
See application file for complete search history.

(56) References Cited

U.S. PATENT DOCUMENTS

| 5,182,912 A * | 2/1993 | Parker ..................... F24S 20/20 60/641.8 |
| 2016/0033212 A1* | 2/2016 | Wang ..................... H01L 23/427 165/104.21 |
| 2017/0276383 A1* | 9/2017 | Gilbert ..................... F28D 9/00 |

OTHER PUBLICATIONS

Siedel, S., et al., Analysis of the Interface Curvature Evolution During Bubble Growth, Heat Transfer Engineering, vol. 35, No. 5, 2014, pp. 528-536.
Lee, G., et al., Assessing Nucleation in Cloud Formation Modelling for Brown Dwarf and Exoplanet Atmospheres, EGU General Assembly Conference, 2015, p. 1.
Wu, W., et al., A Study on Bubble Detachment and the Impact of Heated Surface Structure in Subcooled Nucleate Boiling Flows, Nuclear Engineering and Design, vol. 238, 2008, pp. 2693-2698.
(Continued)

*Primary Examiner* — Davis D Hwu
(74) *Attorney, Agent, or Firm* — McAfee & Taft

(57) ABSTRACT

Methods and systems are disclosed which utilize liquid-philic surfaces and liquid-phobic surfaces to more safely and efficiently boil liquids and/or condense vapors. The methods and systems generally utilize two separated surfaces for nucleate boiling, where one of the surfaces is liquid-philic and the other is liquid-phobic. The methods and systems can utilize a condensing surface for condensing vapors, where the condensing surface can have liquid-philic regions and liquid-phobic regions.

20 Claims, 9 Drawing Sheets

(56) References Cited

OTHER PUBLICATIONS

Uzel, S., et al., Modeling the Cycles of Growth and Detachment of Bubbles in Carbonated Beverages, J. Phys. Chem. B, American Chemical Society, 2006, pp. 7579-7586.
Tawfik, M., et al., On the Relation Between Onset of Bubble Nucleation and Gas Supersaturation Concentration, Electrochimica Acta, vol. 146, 2014, pp. 792-797.
Planeta, J., et al., Distribution of Sulfur-Containing Aromatics Between [hmim][Tf 2 N] and Supercritical CO 2: A Case Study for Deep Desulfurization of Oil Refinery Streams by Extraction with Ionic Liquids, Green Chemistry, 2005, pp. 70-77.
Perez-Garibay, R., et al., Gas Dispersion Measurements in Microbubble Flotation Systems, Minerals Engineering, vol. 26, 2012, pp. 34-40.
Mangan, M., et al., Delayed, Disequilibrium Degassing in Rhyolite Magma: Decompression Experiments and Implications for Explosive Volcanism, Earth and Planetary Science Letters, 2000, pp. 441-455.
Kortekaas, T.F., et al., Liberation of Solution Gas During Pressure Depletion of Virgin and Watered-Out Oil Reservoirs, SPE Reservoir Engineering, 1991, pp. 329-335.
Golbin, M., et al., Numerical Modeling of Bubble Growth in the Solution Gas Drive Process in Heavy Oil Reservoirs, Advances in Chemistry Research, vol. 28, Chapter 7, 2015, p. 209.
Gateau, J., et al., Statistics of Acoustically Induced Bubble-Nucleation Events in Invitro Blood: A Feasibility Study, Ultrasound in Med & Biol., vol. 39, No. 10, 2013, pp. 1812-1825.
Gateau, J., et al., In Vivo Bubble Nucleation Probability in Sheep Brain Tissue, Phys. Med. Biol., vol. 56, 2011, p. 7001-7015.
Elman, N., et al.. An Implantable MEMS Drug Delivery Device for Rapid Delivery in Ambulatory Emergency Care, Biomed Microdevices, 2009, pp. 625-631.
Kalikmanov, V., et al., New Developments in Nucleation Theory and Their Impact on Natural Gas Separation, SPE International, 2007, pp. 1-5.
Lubetkin, S., The Fundamentals of Bubble Evolution, Chemical Society Reviews, 1995, pp. 243-250.
Wang, M., et al., The Intensification Technologies to Water Electrolysis for Hydrogen Production—A Review, Renewable and Sustainable Energy Reviews, 2014, pp. 573-588.
Jones, S., et al., Bubble Nucleation from Gas Cavities—A Review, Advances in Colloid and Interface Science, 1999, pp. 27-50.
Finkelstein, Y., et al., Formation of Gas Bubbles in Supersaturated Solutions of Gases in Water, AIChE Journal, vol. 31, No. 9, 1985, pp. 1409-1419.
Ryan, W. L., et al., Bubble Formation in Water at Smooth Hydrophobic Surfaces, Journal of Colloid and Interface Science, 1993, pp. 312-317.
Ryan, W. L., et al., Bubble Formation at Porous Hydrophobic Surfaces, Journal of Colloid and Interface Science, 1998, pp. 101-107.
Cho, H., et al., Bubble Point Measurements of Hydrocarbon Mixtures in Mesoporous Media, Energy & Fuels, 2017, pp. 3436-3444.
Chen, Q., et al., Electrochemical Generation of a Hydrogen Bubble at a Recessed Platinum Nanopore Electrode, Langmuir, 2015, pp. 4573-4581.
Chen, Q., et al., Electrochemical Measurements of Single H2 Nanobubble Nucleation and Stability at Pt Nanoelectrodes, The Journal of Physical Chemistry Letters, 2014, pp. 3539-3544.
Hanafizadeh, P., et al., The Effect of Gas Properties on Bubble Formation, Growth, and Detachment, Particulate Science and Technology, 2015, pp. 645-651.
Oguz, H. N., et al., Dynamics of Bubble Growth and Detachment From a Needle, J. Fluid Mech., vol. 257, 1993, pp. 111-145.
Chen, D., et al., Prediction of Bubble Detachment Diameter in Flow Boiling Based on Force Analysis, Nuclear Engineering and Design, 2012, pp. 263-271.
Phan, H. T., et al., How Does Surface Wettability Influence Nucleate Boiling?, ScienceDirect, C. R. Mecanique 337, 2009, pp. 251-259.
De Oliveira, R., et al., Measurement of the Nanoscale Roughness by Atomic Force Microscopy: Basic Principles and Applications, 2012, pp. 147-174.
Ishida, N., et al., Nano Bubbles on a Hydrophobic Surface in Water Observed by Tapping-Mode Atomic Force Microscopy, Langmuir, 2000, p. 6377-6380.
Ishida, N., et al., Interaction Forces Between Chemically Modified Hydrophobic Surfaces Evaluated by AFM—The Role of Nanoscopic Bubbles in the Interactions, Minerals Engineering, 2006, pp. 719-725.

\* cited by examiner

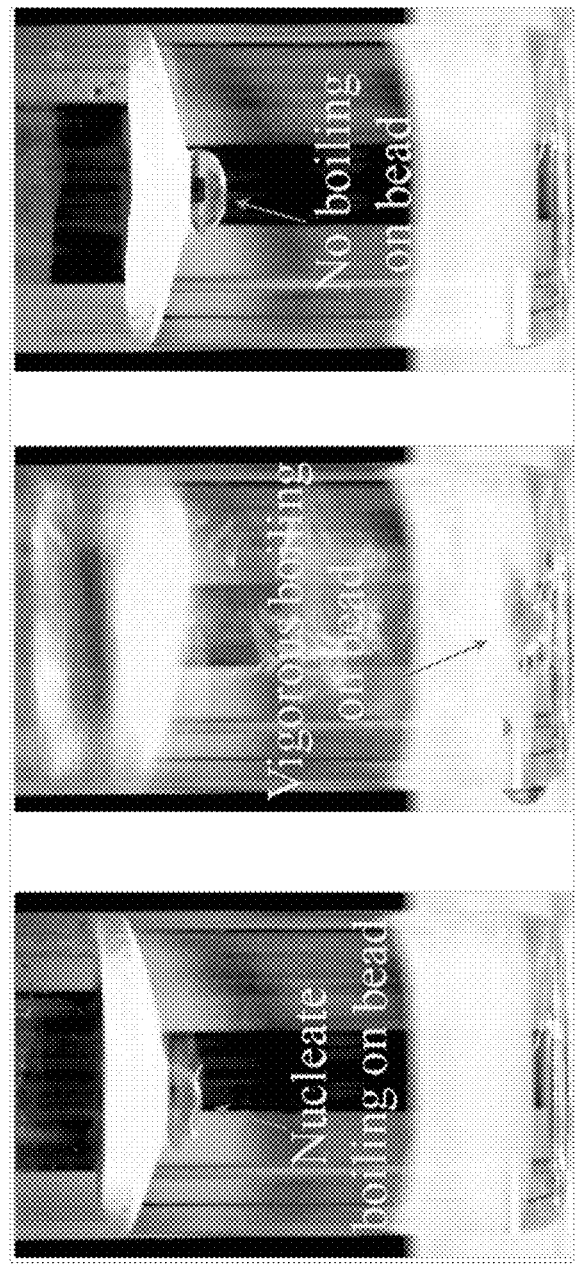

METHOD FOR IMPROVING CRITICAL HEAT FLUX

CROSS-REFERENCE TO RELATED APPLICATION

This application claims the benefit of U.S. Provisional Application No. 62/746,801 filed Oct. 17, 2018, which is hereby incorporated by reference.

FIELD

The present invention relates generally to the boiling of liquids and condensation of vapors, and more specifically, to systems and processes which more efficiently effect boiling and condensation.

BACKGROUND

Boiling is a phenomenon of vital importance in a broad range of industries such as power generation, desalination, chemical processing, refrigeration and electronics thermal management. Nucleate boiling is an efficient way of transferring heat, for a given difference between the heat transfer surface and the fluid temperatures (the so-called wall superheat). The heat transfer coefficient and compactness of boiling heat exchangers increases with increasing heat flux, but beyond a critical value of the heat flux (or critical heat flux (CHF)) a continuous vapor layer develops on the heat transfer surface, thus severely limiting heat transfer (as seen by orders of magnitude reduction in the heat flux), a phenomenon referred to as the 'boiling crisis'.

Often referred to as the "film boiling regime", the development of the vapor layer is characterized by the absence of liquid contact on the heat transfer surface and can be ultimately accompanied by the physical destruction of the heater (or heat transfer surface) depending on its material of construction. CHF is the chief thermal performance limiter in light water-cooled nuclear reactors, and the main reason why industrial boilers are forced to operate at significant heat-flux safety margins. Enhancing CHF can lead to substantial cost savings in terms of reduced capital investment, and significant reductions in carbon emissions.

For example, the occurrence of CHF can deteriorate the integrity of fuel rods of water-cooled nuclear reactors that contain radioactive fission products. Therefore, the water-cooled reactor cores have to be designed to preclude (i.e., to assure the very low probability of) the occurrence of CHF during normal operation and anticipated operational deviations.

As another example, treatment of produced water, which is an unwanted by-product during oil & gas production, is a stringent environmental requirement and the treatment is normally a cost to the company. Desalination is a critical step in treating produced-, sea-, or other saline-water for drinking, industrial usage, and/or irrigation purposes. The global market size of desalination alone is set to reach $26.8 billion in 2025 and the global produced water treatment market is expected to reach $9.79 billion by 2024. Various thermally-, pressure-, and chemically-activated technologies are being used for desalination. Each of these desalination technologies has some merits and demerits over the other technologies. For example, thermal desalination technologies can handle very high salinity feed water and produce very low salinity water (<10 ppm), however, they are energy-intensive. Likewise, reverse osmosis is relatively less energy-intensive, but, has technical issues such as membrane clogging and requires pretreatment of feed water.

High-energy demand and the associated cost is a major concern for thermal desalination technologies. For example, depending upon the total dissolved solids (TDS), the estimated desalination cost for Oklahoma produced water ranges from $3.58 to $7.49 per barrel. To significantly reduce the desalination cost, it is essential to reduce the energy cost for boiling and to improve the boiling process. The high-energy requirement is mainly due to the high latent heat of vaporization, and inefficient boiling processes especially due to 'boiling crisis', which is a phenomenon responsible for a huge decrease in the heat flux (about two orders of magnitude from the critical heat flux).

Accordingly, technologies that avoid the issues related to the boiling crisis are of interest to a broad range of industries. Such technologies could significantly reduce the cost for industries which utilize nucleate boiling, such as power generation, desalination, chemical processing, refrigeration and electronics thermal management.

SUMMARY

Embodiments of this disclosure relate to systems and methods which utilize liquid-philic surfaces and liquid-phobic surfaces to more safely and efficiently boil liquids and/or condense vapors. The methods and systems generally utilize two separated surfaces for nucleate boiling, where one of the surfaces is liquid-philic and the other is liquid-phobic. The methods and systems generally utilize a condensing surface for condensing vapors, where the condensing surface can have liquid-philic regions and liquid-phobic regions.

More specifically, embodiments comprise a method having the steps of introducing liquid into a vessel, wherein the vessel contains liquid-philic surface having a first surface temperature, and the vessel contains a liquid-phobic surface spaced apart from the liquid-philic surface, wherein the liquid-phobic surface has a second surface temperature less than the first surface temperature;

heating the liquid to saturation temperature at the surrounding conditions wherein the temperature difference between the first surface temperature and the saturation temperature is sufficient so that nucleation on the liquid-phobic surface occurs to produce a vapor from the liquid.

The method can further comprise introducing the vapor to a condensing surface, wherein the condensing surface is a heterogeneous surface having at least one liquid-philic region and at least one liquid-phobic region and wherein the condensing surface is at a third surface temperature, which is less than the saturation temperature. Further, the heterogeneous surface can have a continuous liquid-phobic region surrounding one or more liquid-philic regions. Typically, there will be a plurality of liquid-philic regions. Alternatively, the heterogeneous surface can have a continuous liquid-philic region surrounding one or more liquid-phobic regions.

In the above embodiments, the liquid has a contact angle with the liquid-philic surface of no greater than 80° and a contact angle with the liquid-philic region of no greater than 80°, and more typically, these contact angles are no greater than 60°, no greater than 50°, no greater than 40° or no greater than 30°. The liquid has a contact angle with the liquid-phobic surface of greater than 80° and a contact angle with the liquid-phobic region of greater than 80°, and more typically, these contact angles are at least 900, at least 950, at least 1000 or at least 110°.

In some embodiments, the above methods are used to desalinate water. In such embodiments, the liquid is water containing one or more salts, the liquid-philic inner surface is hydrophilic, and the liquid-phobic surface is hydrophobic. In such embodiments, the method further comprising introducing the water vapor to a condensing surface at a third surface temperature, which can be in accordance with the condensing surface described above. If the method is carried out at 1 atm pressure, then the condensing surface for the desalination method will generally be a temperature of below about 20° C., or below about 10° C.

In the above embodiments, the temperature difference is typically at least about 10° C. and often will be from about 10° C. to about 30° C. at about 1 atm pressure.

Embodiments of the system, which can carry out the above method, generally comprise a heater and a vessel. The vessel has a chamber configured to contain the liquid defined by a wall having an inner liquid-philic surface such that the inner liquid-philic surface is in contact with the liquid when liquid is introduced into the chamber. The heater heats the liquid-philic surface to thus heat the liquid. Additionally, the vessel has a liquid-phobic surface spaced apart from the liquid-philic inner surface.

In the embodiments, the heater can comprise an outer transparent sleeve surrounding at least a portion of the wall. A vacuum can be formed between the outer transparent sleeve and an outer surface of the portion the wall. The outer surface is configured to convert solar radiation into heat. Accordingly, solar radiation passes through the outer transparent sleeve and is absorbed on the outer surface to thus heat the inner liquid-philic surface.

The system can further comprise a condensing surface in fluid flow communication with the chamber such that liquid vapor from the vessel can flow to the condensing surface. The condensing surface generally will have a liquid-philic surface and can be a heterogeneous surface having at least one liquid-philic region and at least one liquid-phobic region. Further, the heterogeneous surface has a continuous liquid-phobic region surrounding one or more areas of liquid-philic regions. Alternatively, the heterogeneous surface can have a continuous liquid-philic region surrounding one or more liquid-phobic regions.

As will be realized based on the above, the condensing surface can be used in condensing processes and systems separate from and/or without the nucleate boiling portion of the described system and method.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIGS. 8A, 8B, 8C, 8D, 8E and 8F are images showing bubble nucleation for water when a hydrophobic bead was carefully placed on the surface of water at saturation temperature.

DETAILED DESCRIPTION

Figure 1:
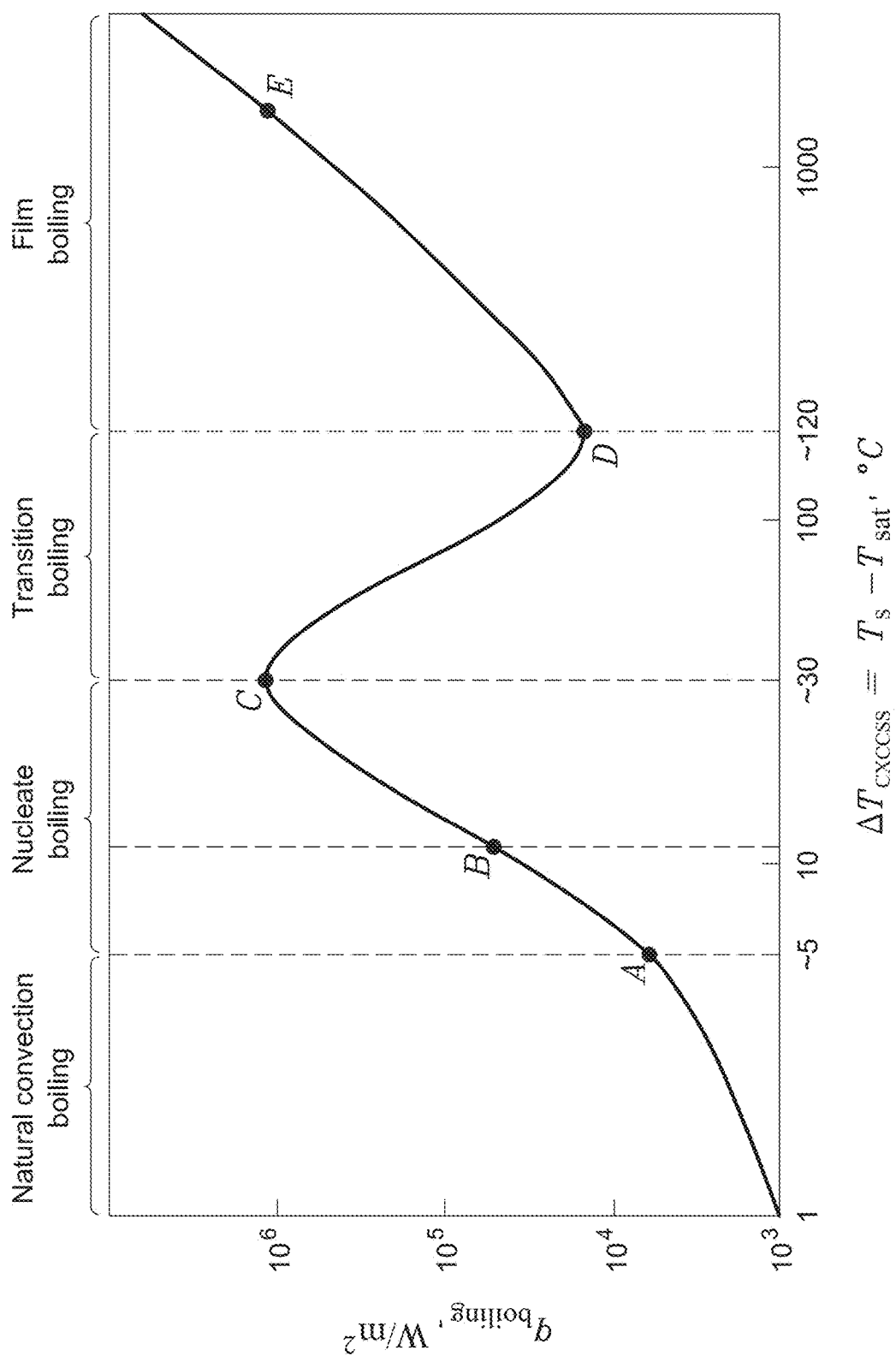
FIG. 1 illustrates a typical boiling curve of water at atmospheric pressure. The curve is based on one published by Shiro Nukiyama in 'The Maximum and Minimum Values of the Heat Q Transmitted from Metal to Boiling Water Under Atmospheric Pressure' published in 1934.

The present disclosure may be understood more readily by reference to this detailed description as well as to the examples included herein. In addition, numerous specific details are set forth in order to provide a thorough understanding of the embodiments and examples described herein. However, those of ordinary skill in the art will understand the embodiments and examples described herein can be practiced without these specific details. In other instances, methods, procedures and components have not been described in detail so as not to obscure the related relevant feature being described. Also, the description is not to be considered as limiting the scope of the embodiments described herein.

In the description, the following terms have the following meanings.

"Wetting", "wettability" and the like refer to the relative affinity of a fluid for an inert solid substrate in the presence of another immiscible or sparingly soluble fluid. Wettability is reflected in the ability of a liquid to maintain contact with a solid surface, resulting from intermolecular interactions when the two are brought together. The degree of wetting (wettability) is determined by a force balance between adhesive and cohesive forces. Adhesive forces between a liquid and solid cause a liquid drop to spread across the surface. Cohesive forces within the liquid cause the drop to ball up and avoid contact with the surface.

"Contact angle" ($\theta$) is the angle at which the liquid-vapor interface meets the solid-liquid interface. The contact angle is determined by the balance between adhesive and cohesive forces. As the tendency of a drop to spread out over a flat solid surface increases, the contact angle decreases. Thus, the contact angle provides an inverse measure of wettability with a contact angle of 0° representing perfectly wetting and a contact angle of 180° indicating perfectly non-wetting. Generally, a contact angle less than 90° (low contact angle) indicates that wetting of the surface is very favorable ("wetting surface"), and the fluid will spread over a large area of the surface. Contact angles greater than 90° (high contact angle) usually means that wetting of the surface is unfavorable ("non-wetting surface"), so the fluid will minimize contact with the surface and form a compact liquid droplet. For water, a wettable surface may also be termed hydrophilic and a non-wettable surface hydrophobic. Super-hydrophobic surfaces have contact angles greater than 150°, showing almost no contact between the liquid drop and the surface.

"Liquid-phobic" refers to a non-wetting surface for the liquid. To be a suitable non-wetting surface, the surface can be a solid surface with which the liquid has a contact angle of from 90° to 180°, with higher angles having a greater effect. Typically, to be a suitable non-wetting solid surface, the liquid has a contact angle with the non-wetting surface of at least 800, but more typically the contact angle is greater than 90°, greater than 95°, greater than 100° or greater than 110°.

"Liquid-philic" refers to a wetting surface for the liquid. To be a suitable wetting surface, the surface can be a solid surface with which the liquid has a contact angle of from 00 to less than 90°, with lower angles having a greater effect. Generally, the contact angle is lower than 90°. Typically, to be a suitable wetting solid surface, the liquid has a contact angle with the wetting surface of less than 80°, and optionally the contact angle is no greater than 60°, no greater than 50°, no greater than 40° or no greater than 30°. It will be understood, that in the process outlined herein, the liquid-philic surface will have a contact angle with the liquid that is lower than the contact angle for the liquid-phobic surface.

"Saturation temperature", more commonly called boiling point, refers to temperature for a corresponding saturation pressure at which a liquid boils into its vapor phase. The liquid can be said to be saturated with thermal energy. Any addition of thermal energy results in a phase transition. If the pressure in a system remains constant (isobaric), a vapor at saturation temperature will begin to condense into its liquid phase as thermal energy (heat) is removed. Similarly, a liquid at saturation temperature and pressure will boil into its vapor phase as additional thermal energy is applied. The saturation temperature corresponds to the temperature at which the vapor pressure of the liquid equals the surrounding environmental pressure.

As will be understood, "saturation pressure" is the pressure for a corresponding saturation temperature at which a liquid boils into its vapor phase. Saturation pressure and saturation temperature have a direct relationship: as saturation pressure is increased, so is saturation temperature. If the temperature in a system remains constant (an isothermal system), vapor at saturation pressure and temperature will begin to condense into its liquid phase as the system pressure is increased. Similarly, a liquid at saturation pressure and temperature will tend to flash into its vapor phase as system pressure is decreased.

The technology of this disclosure is expected to solve the boiling crisis and significantly reduce the cost across the broad range of industries which utilize nucleate boiling, such as power generation, desalination, chemical processing, refrigeration and electronics thermal management. More specifically, this disclosure is directed to a novel, simple but very effective methods and systems to prevent boiling crisis by physically separating and engineering the heating and boiling surfaces. This new method and system significantly improves critical heat flux and reduces the wall superheat required for nucleate boiling. The prevention of boiling crisis and the reduction in wall superheat for nucleate boiling also improves the safety (i.e. by preventing 'burnout' of the heating surface) of the heat transfer systems such as nuclear power reactors. Additionally, the disclosure is directed to novel methods and systems for condensing vapors, which can in conjunction with the methods and systems of nucleate boiling be used for new and effective processes and systems, such as for desalination of salt water.

Boiling is of primary importance to a wide range of industrial and daily-life applications including thermal (coal, geothermal, and nuclear) power generation, automobiles, metallurgy, thermal desalination, chemical processing, food processing, pharmaceuticals, and thermal management in refrigeration and electronic. Being a phase-change heat transfer, boiling provides the most effective heat transfer due to the very high latent heat of vaporization. FIG. 1 shows a typical boiling curve of water at atmospheric pressure. FIG. 1 is based on the curve published by Shiro Nukiyama in his pioneering paper 'The Maximum and Minimum Values of the Heat Q Transmitted from Metal to Boiling Water Under Atmospheric Pressure' published in 1934.

The x-axis of the boiling curve represents the excess temperature or wall superheat ($\Delta T_{excess}$, ° C.). It is the difference between the wall temperature of heating surface (Ts) and the saturation temperature of water ($T_{sat}$). The y-axis represents the heat flux ($q_{boiling}$, W/m$^2$). The curve has four distinct boiling regimes: natural convection boiling, nucleate boiling, transition boiling, and film boiling. During the natural convection boiling (i.e. below point A on the curve), no bubbles are formed on the heating surface and the heat transfer from the heating surface to the fluid occurs by natural convection. Nucleate boiling (A to C on the curve) occurs at a higher wall superheat ($\Delta T_{excess}$) of about 5 to 30° C. There are two sub-regimes in nucleate boiling: A to B sub-regime in which isolated vapor bubbles form on the heating surface and rise through the liquid; and B to C sub-regime in which continuous columns of vapor bubbles are formed. The higher heat flux in this regime is due to the higher heat transfer coefficient (HTC) resulting from the agitation of the liquid by the generation and detachment of vapor bubbles from the heating surface and as well as the higher wall superheat. The point C on the boiling curve is called 'critical heat flux' (CHF). Unfortunately, further increase in wall superheat forces the boiling process into the very inefficient transition-boiling regime (C to D). This is due to the formation of a continuous vapor layer on the heating surface. The vapor layer acts as an insulator for the heat transfer as the thermal conductivity of vapor layer is much lower than that of the saturated liquid. The rapid formation of a continuous vapor layer on heating surface when the heat supply exceeds CHF and the consequent orders of magnitude of reduction in the heat flux is called 'boiling crisis'. Point D is the "Leidenfrost point" where the vapor layer completely separates the liquid from the heating surface. The boiling curve after the point D represents the film boiling where the mode of heat transfer from the heating surface to the liquid is mainly through radiation. The film boiling requires very high wall superheats and sometimes can cause severe technical issues such as "burnout" or melting of the heating surface. This burnout phenomenon is a consequence of the boiling process "departure from nucleate boiling" (DNB).

Of the four boiling regimes, nucleate boiling is the most effective for high heat flux and as well as for process safety. The nucleate boiling process involves nucleation, bubble growth, and detachment stages. The vapor bubble nucleation can occur on a solid surface or in the bulk of a superheated liquid. Bubble nucleation is classified into four different types. In Type 1 nucleation, also called as 'classical homogenous nucleation', bubbles form in the bulk of the liquid. Homogenous nucleation requires overcoming cohesive forces of the liquid molecules. The classical nucleation theory predicts that the Type 1 nucleation requires very high levels of superheating. For example, the initiation of stable vapor nuclei in bulk of water requires a nucleation rate of up to $10^7$ cm$^{-3}$ s$^{-1}$ which corresponds to a superheat temperature of 204° C. The Type 2 nucleation is called 'classical heterogeneous nucleation' and it requires superheating levels similar to Type 1 nucleation. However, the difference between Type 1 and Type 2 nucleations arises from the fact that in Type 2 nucleation, bubbles form inside a pit on the surface of molecularly smooth container/heater, on solid particles present in the bulk of the liquid. Once a bubble is formed inside a pit, it grows and detaches from the surface while leaving a portion of the vapor in the pit. The subsequent vapor bubble production from that location is referred as Type 3 nucleation and it requires a much lower superheating in comparison to Type 1 and Type 2 nucleations. The Type 3 nucleation is called 'pseudo classical nucleation'. This allows for the energy barrier required to induce nucleation to be lower because of the preexisting gas cavity, a nucleation site. The Type 4 nucleation is called 'non-classical nucleation'. It requires almost no energy barrier for nucleation because the radius of curvature of the preexisting gas in the cavities is larger than the critical radius of curvature which produces the vapor bubbles continuously even at a very low level of superheating.

As will be appreciated from the above, the bubble nucleation process typically initiates at a solid surface due to lower levels of energy barriers. The present inventor has realized, the solid surface properties, especially wettability and topology, would be critical for the bubble nucleation step.

After bubble nucleation step, the bubble starts growing, which is the second step in the vapor-bubble liberation process. Bubble growth is followed by the last stage of the nucleate boiling process, which is bubble detachment. The necessary condition for bubble detachment in a relatively stagnant system is that the buoyant and pressure forces, which are responsible for pulling the droplet away from the solid surface, dominate the surface tension force, which is responsible for keeping the bubble adhered to the solid surface. Individual bubbles can grow large enough to gain sufficient buoyant force for the detachment, or two or more bubbles can coalesce to become a large-enough bubble for detachment. However, when the system has significant flow disturbances such as in flow boiling, other surface (drag) and body (inertial) forces also significantly contribute towards the bubble detachment process. Since the bubble detachment process involves surface forces, the current inventor has realized that the wettability and topology influence the process.

Although a plethora of publications exist in the area of nucleate boiling, still the phenomenon has not been completely understood because of its complexity due to various coupled heat, momentum, and mass transfer mechanisms. While not wishing to be bound by theory, the inventor currently believes that this complexity is partly due to the coupling effects of heating and boiling surfaces. To date, all the previous experimental and theoretical studies considered the same surface for heating and boiling. This disclosure takes advantage of the novel concept of decoupling the influence of boiling and heating surfaces on CHF by physically separating them in the pool boiling system.

Figure 2:
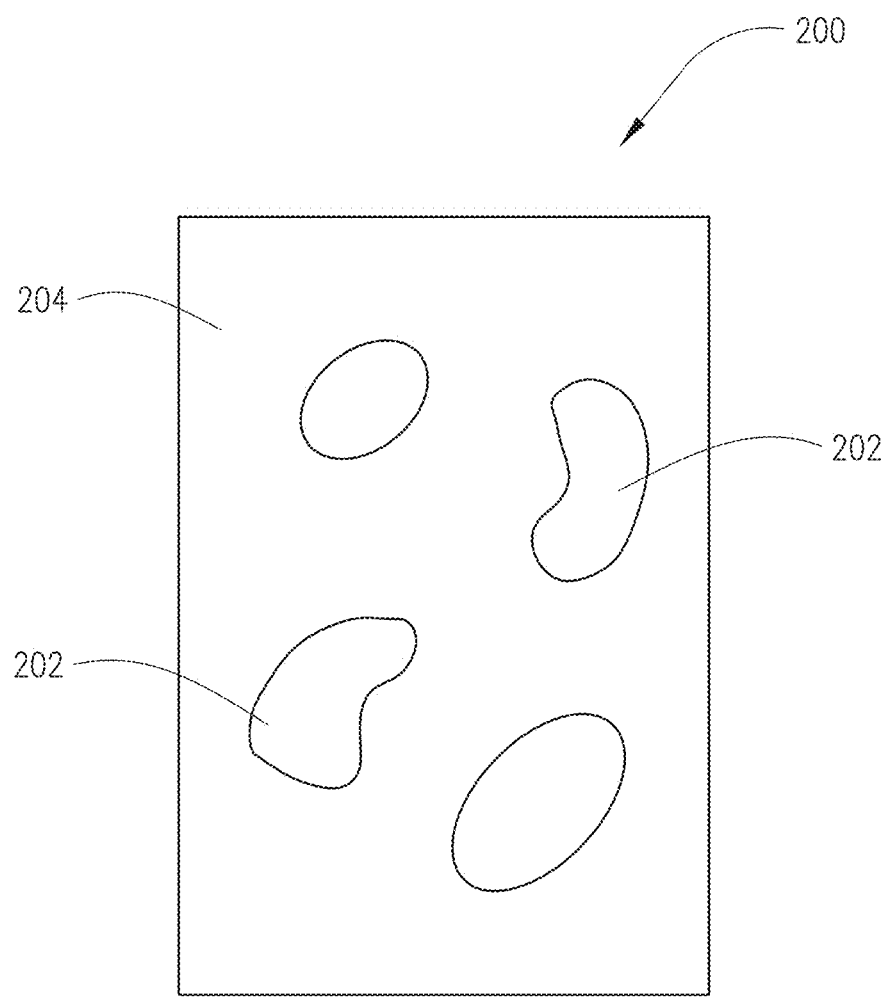
FIG. 2 is a schematic illustration of a heterogeneous surface that can be used in condensation systems and processes in accordance with embodiments.

Similar to boiling, condensation is also a phase change heat transfer process but from vapor to liquid state. Condensation can occur in either filmwise or dropwise modes. In filmwise condensation, a continuous film of condensed liquid forms on the cooling (heat transfer) surface, and it causes a significant reduction in heat transfer coefficient and hence rate of condensation. Whereas in the case of dropwise condensation, condensed liquid droplets quickly separate from the cooling surface and the heat transfer coefficient is significantly higher compared to filmwise condensation. The surface wetting nature of cooling surface to condensed water has a strong influence on the type of condensation. If the condensed liquid wets the cooling surface, the rate of nucleation of liquid droplet will be significantly higher, but it also leads to filmwise condensation and consequently causes a significant reduction in heat transfer coefficient. On the other hand, when the condensed liquid droplet does not wet the cooling surface, dropwise condensation occurs, but the rate of droplet nucleation would be significantly lower. Accordingly, heterogeneous surfaces can perform better for condensation. The heterogeneous surfaces of this disclosure are surfaces with liquid-philic areas and liquid-phobic areas (hydrophilic areas and hydrophobic areas when water is the liquid). For example, the heterogeneous surface 200 illustrated in FIG. 2 has patches of liquid-philic regions 202 in continuous liquid-phobic surface 204. As will be realized, continuous liquid-phobic surface 204 forms one continuous interconnected hydrophobic region with island of one or more liquid-philic regions 202 interspersed in the liquid-phobic surface or region 204. That is, the liquid-phobic area is one connected area over the surface and surrounds areas of liquid-philic nature. Alternatively, the heterogeneous surface can have a continuous liquid-philic region surrounding one or more liquid-phobic regions.

Broadly, the systems of this disclosure for carrying out nucleated boiling generally comprise a heater and two separated surfaces, one liquid-philic and one liquid-phobic. The surfaces are in contact with the liquid to be boiled. The liquid-philic surface is heated by the heater to a temperature greater than the saturation temperature of the liquid. The nucleated boiling occurs on the liquid-phobic surface. For example, the system can comprise a vessel having a chamber configured to contain the liquid. The chamber is defined by a vessel wall having an inner liquid-philic surface such that the inner liquid-philic surface is in contact with the liquid when liquid is introduced into the chamber. The heater heats the liquid-philic surface to thus heat the liquid. Additionally, the vessel has a liquid-phobic surface spaced apart from the liquid-philic inner surface. Thus, the liquid-philic surface heats the liquid and the nucleated boiling occurs on the liquid-phobic surface. Accordingly, the heating and boiling surfaces are separated to avoid the boiling crisis.

The method, which can be used for nucleated boiling of a liquid, has a first step of introducing liquid into a vessel. The vessel has a liquid-philic surface having a first surface temperature, and the vessel contains a liquid-phobic surface spaced apart from the liquid-philic surface. Typically, the liquid-phobic surface has a second surface temperature less than the first surface temperature.

The liquid-philic surface is heated to maintain the first surface temperature. Generally, the heating should be sufficient to heat the liquid to saturation temperature at the surrounding conditions and to produce a temperature difference between the first surface temperature and the saturation temperature sufficient so that nucleation on the liquid-phobic surface occurs to produce a vapor from the liquid.

Generally, the liquid-philic surface is heated above the saturation temperature of the liquid. In the current invention, the nucleated boiling system and method avoids the critical heat flux and Leiderfrost point. Accordingly, the difference between the first surface temperature and the saturation temperature of the liquid can be maintained at temperatures both above those temperatures that would be the Leiderfrost point and the Critical heat flux for systems relying on a single surface for heating and nucleated boiling. For example, if the process is carried out for water at about 1 atm pressure or at atmospheric pressure, the first surface temperature can be more than 5° C. above the saturation temperature of the liquid, and more typically at least 10 OC, but also can be more than 30° C., more than 100° C. or even more than 120° C. above the saturation temperature of the liquid.

In the system and method, the liquid will have a contact angle with the liquid-philic inner surface of no greater than 80°, and more typically, the contact angle is no greater than 60°, no greater than 50°, no greater than 40° or no greater than 30°. Further, the liquid will have a contact angle with the liquid-phobic surface of greater than 80°, and more typically, at least 90°, at least 950, at least 100° or at least 110°.

The system for carrying out condensation can comprise a condensing surface within a vessel such that vapor can flow into the vessel and across the condensing surface. The condensing surface can be the vessel walls or a surface within the vessel and separated from the container walls. The condensing surface has a liquid-philic surface and can be a heterogeneous surface having at least one liquid-philic region and at least one liquid-phobic region. Further, the heterogeneous surface can have a continuous liquid-phobic region surrounding one or more areas of liquid-philic regions, as previously described. Alternatively, the heterogeneous surface can have a continuous liquid-philic region surrounding one or more liquid-phobic regions.

In the method of condensation, the vapor is introduced into the vessel so that it flows across the condensing surface, which is cooled below the saturation temperature of the vapor such that condensation occurs on the condensing surface. The liquid condensed from the vapor will flow down the surface and can be taken off from the bottom of the vessel.

Generally, the liquid will have a contact angle with the liquid-philic region of no greater than 80°, and more typically, the contact angle is no greater than 60°, no greater than 50°, no greater than 40° or no greater than 30°. The liquid will have a contact angle with the liquid-phobic region of greater than 80°, and more typically, at least 900, at least 950, at least 1000 or at least 110°.

Figure 3:
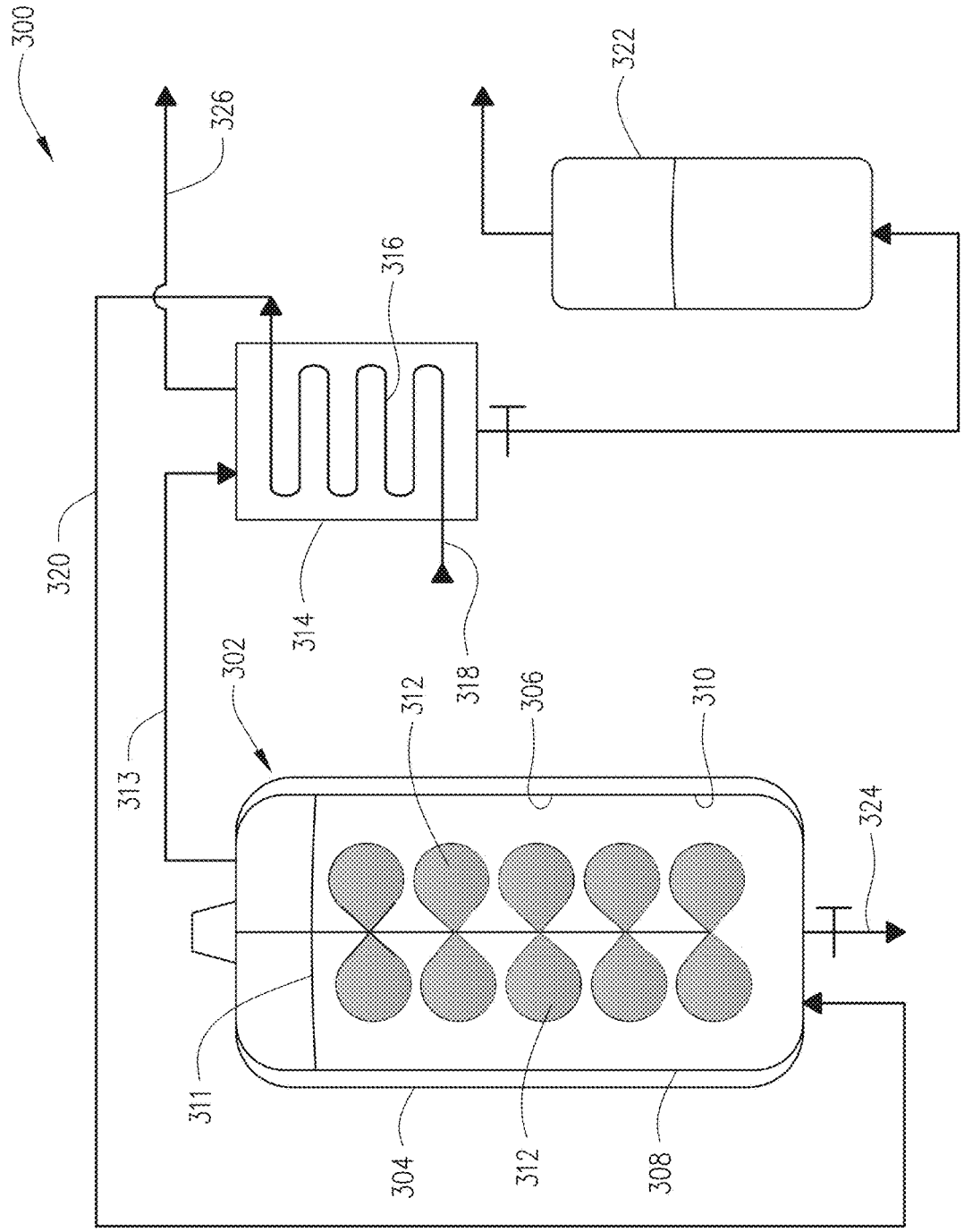
FIG. 3 is a schematic of a solar thermal desalination system in accordance with embodiments of this disclosure.

By way of example of the methods and systems of this disclosure, in one embodiment, the above can be advantageously employed in a cost-effective high-efficiency solar thermal desalination technology for produced water treatment and desalination applications such as is illustrated in FIG. 3. The system 300 employing this technology can comprise a first vessel 302 having an outer wall 304 and inner wall 306, typically with a vacuum in-between. The outer wall 304 will generally be transparent to allow the transmission of solar radiation. Inner wall 306 is heat conducting and has an outer surface 308 with a solar collector coating. Inner wall 306 has a hydrophilic inner surface 310. Accordingly, outer wall 304 and inner wall 306 form a heater, or in this case a solar heater for heating liquid (salt water) in vessel 302.

Suitable solar collecting coatings are known in the art and the coating should be selected to be efficient and cost effective in converting incident radiation into heat. Preferably, the solar collecting coating should be selected so as to be easily applied and have good longevity. For example, as suitable solar collecting coating is Thurmalox® 250 solar selective coating.

The heat conducting inner wall 306 should be selected to be compatible with the solar collector coating and have the ability to efficiently conduct the heat to the liquid to be boiled. Inner surface 310 can be engineered to suppress the formation of vapor bubbles in order to prevent 'boiling crisis'. Thus, as indicated above, inner surface 310 will be chosen to be liquid-philic, or for desalination of water, will be hydrophilic.

For example, in one embodiment, the solar collector coatings can be applied on the surface of a metal that will be used for the boiling chamber of the solar thermal desalination system. The coated side of the metal surface will be vacuum sealed using a transparent material as outer wall 304 that allows maximum transmission of solar radiation to the solar collector coating. The innermost surface of the vessel can be made hydrophilic or, when necessary, superhydrophilic either by applying coatings such as HydroPhil™ coatings by Lotus Leaf Coatings or by laser texturing and $SiO_2$ desposition.

Additionally, vessel 302 will contain one or more boiling surfaces 312. Boiling surfaces 312 are spaced apart from inner surface 310 so that boiling surfaces 312 are not in contact with inner surface 310. Boiling surfaces 312 should efficiently boil (i.e., rate of bubble nucleation per unit area) the feed water at a very low wall superheat and help prevent boiling crisis. Accordingly, boiling surfaces 312 are selected to be liquid-phobic, or for desalination of water, will be hydrophobic. Suitable coatings for the boiling surface include (heptadecafluoro-1,1,2,2-tetrahydrodecyl)triethoxysilane.

As will be realized, the outer wall 304 and inner wall 306 will act as a heater and heat the liquid to its saturation temperature, such that nucleation occurs on boiling surfaces 312 to generate water vapor, which can be taken off as stream 313. Generally, condensation vessel 314 will be run so that all the boiling surfaces are covered in water, as represented by vapor-liquid interface line 311. The water vapor is introduced to a condensation vessel 314, which is in fluid flow communication with vessel 302. Condensation vessel 314 contains one or more condensing surfaces 316. Condensing surface 316 can be the inside surface of condensation vessel 314, a surface positioned in the interior of condensation vessel 314 (as shown), or both. Condensing surface 316 should be able to efficiently condense (i.e., rate of condensation per unit area) the water vapor at the similar rate of water vapor generation. Condensation surface 316 is preferably a heterogeneous surface as described herein and will typically be cooled to a temperature below the saturation temperature of the water. For example, if the system is operated at about atmospheric pressure, condensation surface 316 will generally be cooled to 20° C. or less, or 10° C. or less.

As shown in FIG. 3, condensation surface 316 can be formed from condensing tubes or the like. Thus, a salt-water feed 318 can be introduced to flow through condensation surface 316. This serves to cool condensation surface 316 to an appropriate temperature and pre-heat the saltwater feed. Pre-heat salt-water feed is taken from the condensing tubes and introduced into vessel 302 via line 320, where it undergoes heating due to heated inner surface 310 and nucleated boiling at boiling surfaces 312. By separating the heating surface (heated inner surface 310) and boiling surface 312, the current systems and methods avoid problems associated with development of a vapor layer on heating surface, which occurs when the same surface acts as both the heating and boiling surfaces.

The nucleated boiling produces water vapor which is taken off through line 313 to be introduced into condensation vessel 314. Within condensation vessel 314, water condenses on condensing surface 316 and then flows downward to the bottom of condensation vessel 314 where it can be removed to a storage vessel 322. During the process, salt from the salt water will be left behind as the water vaporizes; thus, a concentrated brine will be produced at the bottom of vessel 302, which can be removed through line 324. Additionally, any non-condensed vapors in condensation vessel 314 can be removed through line 326.

While the above is described in terms of a desalination system and process and the nucleate boiling of water, those skilled in the art will realize that the application can be expanded to other industrial areas and other liquids and liquid-based solutions. More generally, the systems and methods described herein can be adapted to most industrial processes and systems that rely on nucleate boiling. Additionally, the systems and methods can be adapted to nucleate boiling of non-aqueous liquids. In such circumstances, in accordance with embodiments of this disclosure, the heating and boiling surfaces are physically separated, and the heating surface is liquid-philic to prevent the formation of vapor bubbles or a continuous vapor layer rapidly on the heating surface, and the boiling surface is liquid-phobic to promote bubble nucleation at a lower wall super heat. Similarly, the condensation surface can be heterogeneous surface having liquid-philic areas and liquid-phobic areas.

EXAMPLES

Experimental examples were conducted representing a novel demonstration of decoupling of the influence of heating and boiling surfaces on boiling phenomena by physically separating them from each other. From the below examples, it can be seen that the nucleate boiling can be spatially controlled by manipulating the wetting states of heating and boiling surfaces. In other words, nucleate boiling can be suppressed where it is not required, and prompted where it is required. In the case of boiling heat transfer, it would be beneficial to suppress nucleate boiling at the heating surface in order to prevent the formation of a continuous vapor layer on it and promote nucleate boiling at the boiling surface to prevent the superheating at the heating surface. Thus, in accordance with embodiments of this disclosure, the heating and boiling surfaces are physically separated, and the heating surface is liquid-philic to prevent the formation of vapor bubbles due to the very high energy requirement, and the boiling surface is liquid-phobic to promote bubble nucleation at a very low superheat.

Example I

Temperature-controlled pool boiling experiments were conducted using various configurations of hydrophilic heating surfaces and hydrophobic boiling surfaces. 3.7 mL (15 mm O.D. and 45 mm height), and 20 mL (28 mm O.D. and 61 mm height) glass vials were used as hydrophilic heating surfaces. The clean and smooth glass surfaces are inherently hydrophilic. The hydrophobic boiling surfaces were prepared using 3 mm diameter glass rods and beads. The originally hydrophilic glass rods and beads were hydrophobized using (heptadecafluoro-1,1,2,2-tetrahydrodecyl)triethoxysilane (HT).

Figure 4A:
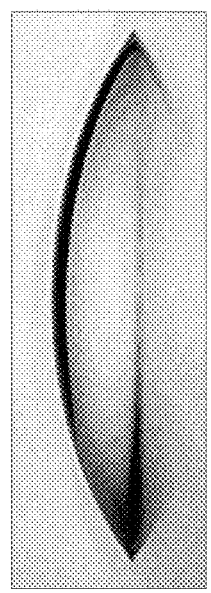
FIGS. 4A and 4B are illustrations of air-water contact angles for an untreated glass (FIG. 4A) and a heptadecafluoro-1,1,2,2-tetrahydrodecyl)triethoxysilane (HT) treated glass slide (FIG. 4B).
Figure 4B:
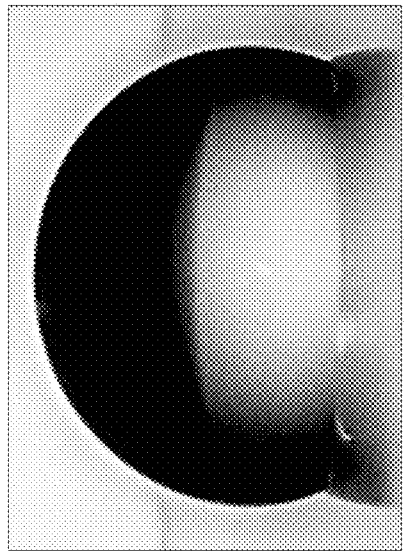
Figure 4C:
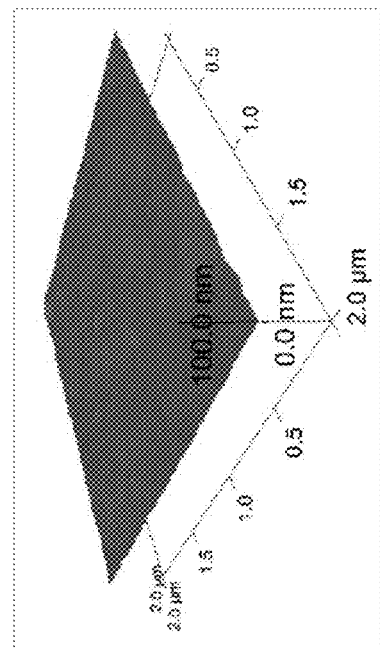
FIGS. 4C and 4D are illustrations of 3D surface topographies of untreated glass (FIG. 4C) and HT treated glass (FIG. 4D).
Figure 4D:
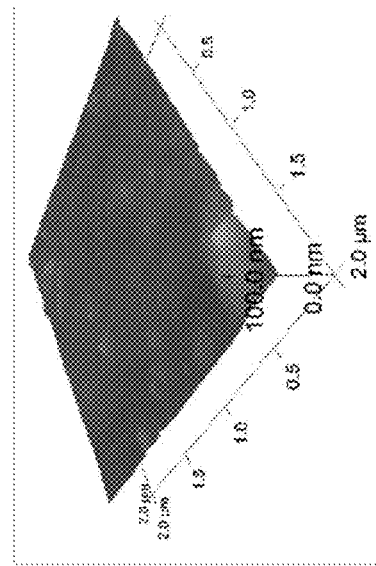

FIGS. 4A and 4B present the air-water contact angle measurements on untreated, and HT treated glass surfaces, respectively. The average air-water contact angle on five untreated glass samples was 33.9°±0.4°. The corresponding contact angle on HT treated surfaces was 114.6°±0.75°. FIGS. 4C and 4D show the 3D surface topographies (obtained from atomic force microscopy) of untreated and HT treated glass surfaces. The average roughness values of untreated and HT treated surfaces were 1.1±0.1 nm and 2.4±0.2 nm respectively.

Example II

Pool boiling experiments using the hydrophilic heating and hydrophobic boiling surfaces of Example I were conducted in four different ways:
(1) The hydrophobic rod was inserted into the water inside the hydrophilic vial from the beginning of the heating, as shown in FIGS. 5A-5E;
(2) The hydrophobic rod was inserted after the water inside the hydrophilic vial had reached saturation temperature, as shown in FIGS. 6A-6C;
(3) The hydrophobic bead was carefully floated on water surface inside the hydrophilic vial, as shown in FIGS. 7A-7F, from the beginning of the heating;
(4) The hydrophobic bead was carefully placed on the surface of water at saturation temperature, as shown in FIGS. 8A-8F.

It should be noted that the density of glass bead was 2.5 gm/cc, but it was able to float on water due to the hydrophobicity of bead and also high surface tension (i.e., ~59 mN/m or dyne/cm) of water even at the saturation temperature.

Figures 5A, 5B, 5C:
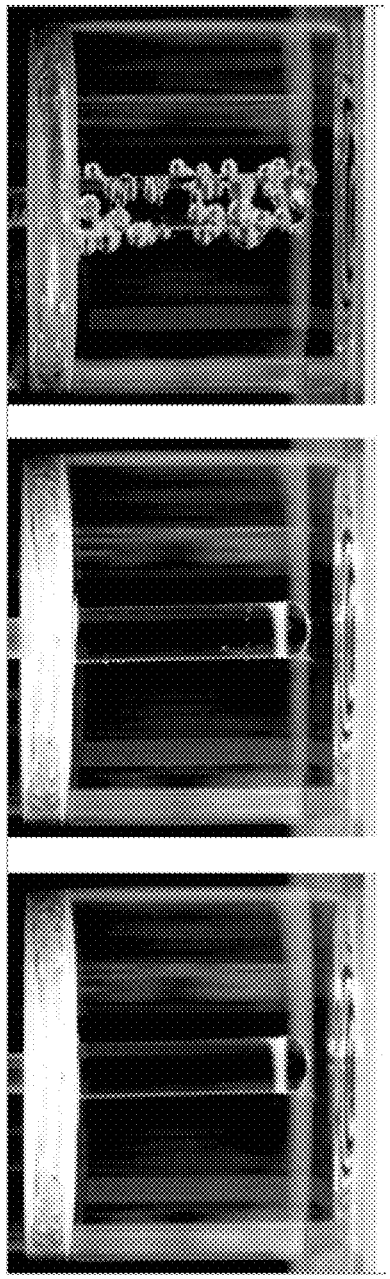
FIGS. 5A, 5B, 5C, 5D and 5E are images showing bubble nucleation for water when heated with a hydrophobic rod insert into the water inside a hydrophilic vial from the beginning of the heating.
Figure 5E:
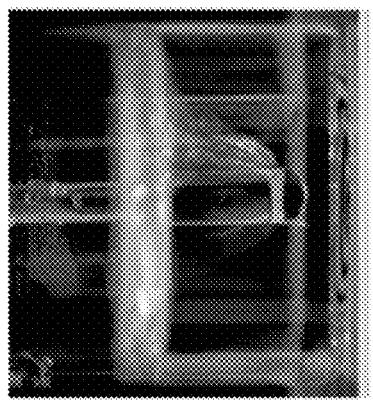
Figure 5D:
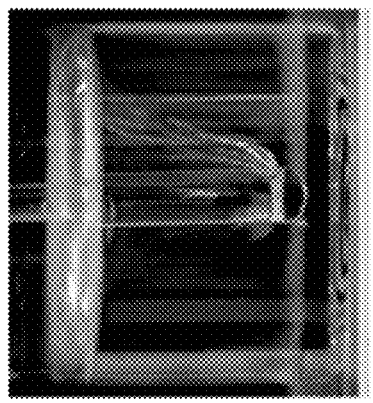
Figures 6A, 6B, 6C:
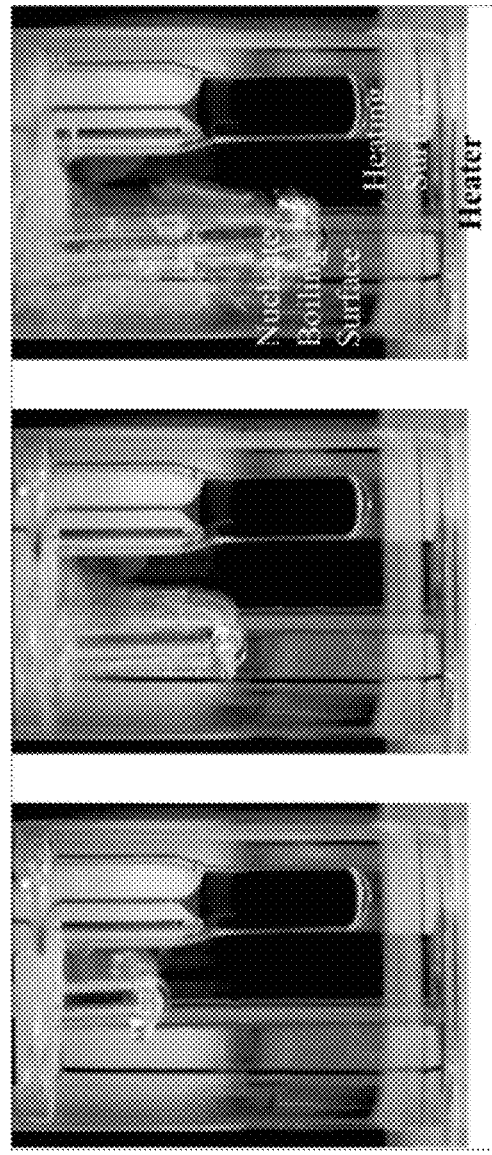
FIGS. 6A, 6B and 6C are images showing bubble nucleation for water when a hydrophobic rod was inserted after the water inside the hydrophilic vial had reached saturation temperature.
Figure 7A:
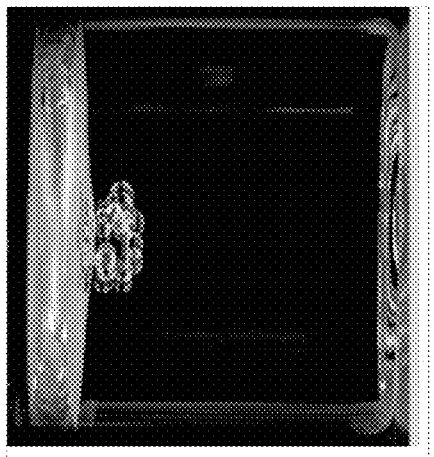
FIGS. 7A, 7B, 7C, 7D, 7E and 7F are images showing bubble nucleation for water when a hydrophobic bead was carefully floated on water surface inside the hydrophilic vial from the beginning of the heating.
Figure 7B:
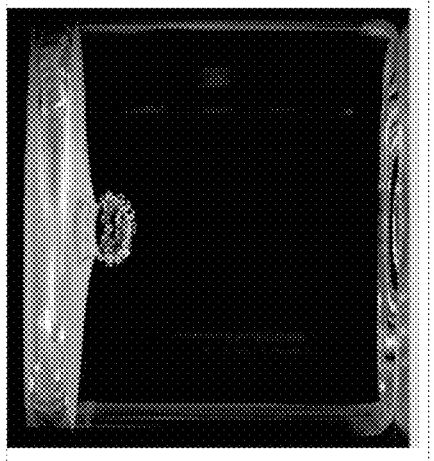
Figure 7C:
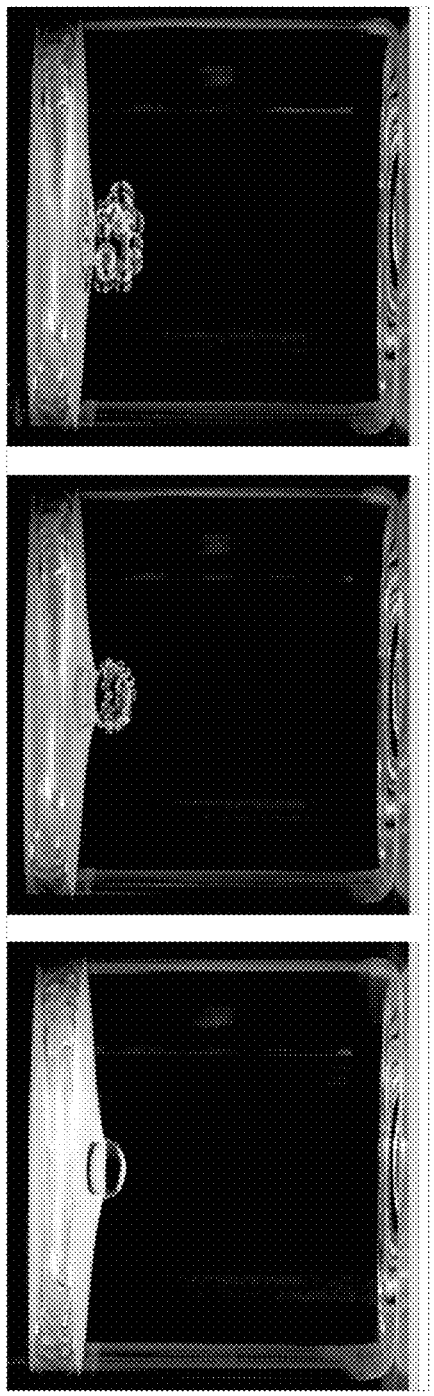
Figure 7D:
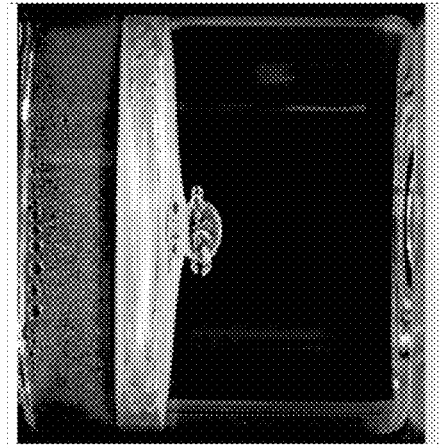
Figure 7E:
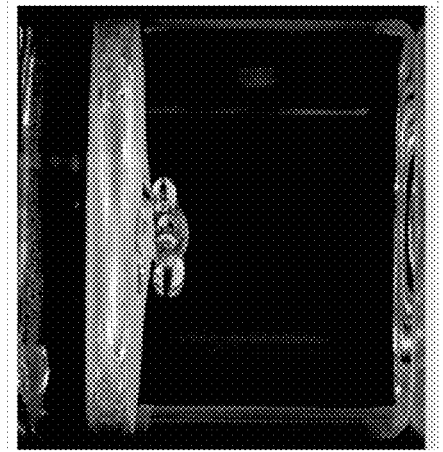
Figure 7F:
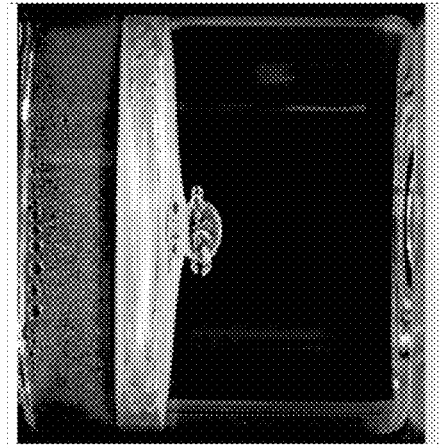

FIG. 5A shows the picture of the hydrophobic glass rod immersed in 20 mL hydrophilic glass vial containing water to a height of ~15 mm. The vial was placed on a temperature-controlled heater surface set at 200° C. As the water temperature reaches to about 40° C. in the case of DI water, and 85° C. in the case of degassed DI water, vapor bubble nucleation on the rod surface was observed (FIG. 5B). The bubbles started to grow and slowly detached from the rod surface as the saturation temperature approaches (FIG. 5C). Upon further heating, at saturation temperature, vigorous nucleate boiling was observed on the rod surface (FIGS. 5D and 5E). During the entire experiment, no vapor bubbles were formed on the hydrophilic vial surface even though the surface was at a significantly higher temperature compared to the surface temperature of the rod which would be at the liquid temperature.

FIGS. 6A, 6B, and 6C show instantaneous vigorous nucleation on the hydrophobic glass rod while it was being inserted into the water at saturation temperature. The heater temperature was set at 200° C. and the initial liquid level in the vial was ~30 mm. After the initial vigorous bubble nucleation phase, rate of nucleation appeared to slow down and occasionally became intermittent. This could be because of the quick reduction in wall superheat by the convective/evaporative cooling due to nucleate boiling at the hydrophobic rod. In the previous case, the nucleate boiling at the rod was rather continuous that could be due to relatively lower volume of the liquid and hence the heat flux coming into the system may be sufficient to balance the convective/evaporative cooling.

FIGS. 7A to 7F show the sequence of nucleate boiling on the 3 mm diameter hydrophobic glass bead floating on the surface of water from the beginning of heating. The heater was set at 200° C. The temperature of liquid in FIG. 7A was 24° C. The images in FIGS. 7B and 7F were captured after 7 minutes and 28 minutes of heating, respectively. It can be observed from the images that the nucleate boiling was only happening on the surface of the bead even though the surface temperature of the bead was at the fluid temperature.

Figures 8A, 8B, 8C:
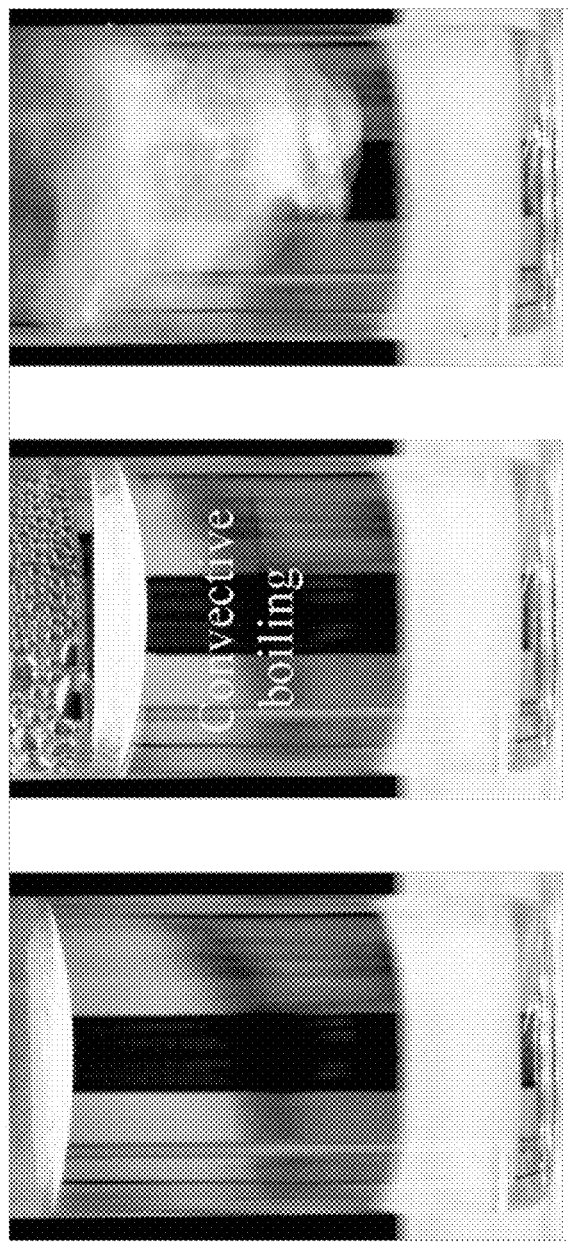

FIGS. 8A to 8F show various physical phenomena occurring during the pool boiling event in 3.7 mL hydrophilic glass vial with 3 mm hydrophobic glass bead placed on the surface of water at saturation temperature. FIG. 8A was taken at the beginning of heating. The image in FIG. 8B was captured after the fluid reached its saturation temperature and some convective boiling had taken place. FIG. 8C shows the vigorous nucleate boiling upon the placement of hydrophobic glass bead on the saturated water surface. Initially, the bead was about to fall to the bottom of the vial but the vapor bubbles lifted the bead up and placed it back on the surface of water. The nucleate boiling continued on the bead surface at a lower rate, as shown in FIG. 8D. After about 20 seconds, the bead fell down to the bottom of the vial due to the perturbations caused by the bubble nucleation on the bead and the instability at the water surface (FIG. 8E).

As the bead was falling to the bottom of the vial, the nucleate boiling on the bead became more and more vigorous. This could be due to the availability of higher wall superheat near the heating surface. After about 20 more seconds of vigorous nucleation, the bead was lifted back to the water surface by the buoyant force of vapor bubbles forming on the bead. After the bead was taken to the surface, no bubble nucleation was observed for about a minute, as shown in FIG. 8F, and the above cycle of events was repeated multiple times. This observation suggests that the vigorous nucleation on the bead surface caused a significant drop in the fluid temperature and/or the temperature at the boiling surface. Please note that the black vertical strip in the images of FIGS. 8A-8F are just the background reflection.

The above examples suggest that it is possible to avoid 'boiling crisis' and significantly improve critical heat flux.

Therefore, the present systems and methods are well adapted to attain the ends and advantages mentioned, as well as those that are inherent therein. The particular examples disclosed above are illustrative only, as the present system and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While systems and methods are described in terms of "comprising," "containing," "having," or "including" various components or steps, the systems and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
introducing liquid into a vessel, wherein the vessel contains a liquid-philic surface having a first surface temperature, and the vessel contains a liquid-phobic surface spaced apart and separated from the liquid-philic surface so that the liquid-phobic surface is not in contact with the liquid-philic surface, wherein the liquid-phobic surface has a second surface temperature less than the first surface temperature;
heating the liquid-philic surface so as to heat the liquid to saturation temperature at the surrounding conditions wherein the temperature difference between the first surface temperature and the saturation temperature is sufficient so that nucleation on the liquid-phobic surface occurs to produce a vapor from the liquid.

2. The method of claim 1, wherein the liquid has a contact angle with the liquid-philic surface is no greater than 80° and a contact angle with the liquid-phobic surface of at least 90°.

3. The method of claim 1, further comprising introducing the vapor to a condensing surface, wherein the condensing surface is a heterogeneous surface having at least one liquid-philic region and at least one liquid-phobic region and wherein the condensing surface is at a third surface temperature, which is less than the saturation temperature.

4. The method of claim 3, wherein the heterogeneous surface has a continuous liquid-phobic region surrounding one or more liquid-philic regions.

5. The method of claim 4, wherein the liquid has a contact angle with the liquid-philic surface and with the liquid-philic region of no greater than 60° and a contact angle with the liquid-phobic surface and the liquid-phobic region of at least 110°.

6. The method of claim 1, wherein the liquid is water containing one or more salts, the liquid-philic surface is hydrophilic, and the liquid-phobic surface is hydrophobic, the method further comprising introducing the water vapor to a condensing surface at a third surface temperature, which is less than the saturation temperature.

7. The method of claim 6, wherein the temperature difference is at least about 10° C.

8. The method of claim 6, wherein the condensing surface is a heterogeneous surface having at least one liquid-philic region and at least one liquid-phobic region.

9. The method of claim 8, wherein the water has a first contact angle with the liquid-philic surface of no greater than 60° and a second contact angle liquid-philic region of no greater than 60°, and a third contact angle with the liquid-phobic surface of at least 110° and a fourth contact angle with the liquid phobic region of at least 110°.

10. The method of claim 8, wherein the temperature difference is from about 10° C. to about 30° C. at about 1 atm pressure.

11. The method of claim 10, wherein the condensing surface is at a temperature below 20° C.

12. A system comprising:
a heater;
a vessel having a chamber configured to contain the liquid, the vessel having:
a wall having an inner liquid-philic surface defining the chamber such that the inner liquid-philic surface is in contact with the liquid when liquid is introduced into the chamber, and wherein the heater heats the liquid-philic surface to thus heat the liquid; and
a liquid-phobic surface spaced apart and separated from the liquid-philic inner surface so that the liquid-phobic surface is not in contact with the liquid-philic surface.

13. The system of claim 12, wherein the heater comprises an outer transparent sleeve surrounding at least a portion of the wall with a vacuum between the outer transparent sleeve and an outer surface of the portion of the wall, and wherein the outer surface is configured to convert solar radiation into heat, such that solar radiation passes through the outer transparent sleeve and is absorbed on the outer surface to thus heat the inner liquid-philic surface.

14. The system of claim 13, wherein the liquid has a contact angle with the liquid-philic inner surface is no greater than 80° and a contact angle with the liquid-phobic surface of at least 90°.

15. The system of claim 14, further comprising a condensing surface in fluid flow communication with the chamber such that liquid vapor from the vessel can flow to the condensing surface, and wherein the condensing surface is a heterogeneous surface having at least one liquid-philic region and at least one liquid-phobic region.

16. The system of claim 15, wherein the liquid has a first contact angle with the liquid-philic inner surface of no greater than 60° and a second contact angle with the liquid-philic region of no greater than 60°, and a third contact angle with the liquid-phobic surface of at least 110° and a forth contact angle with the liquid phobic region of at least 110°.

17. The system of claim 16, wherein the heterogeneous surface has a continuous liquid-phobic region surrounding one or more liquid-philic regions.

18. A method for desalinating water containing one or more salts, the method comprising:

introducing the water containing one or more salts into a vessel, wherein the vessel comprises a hydrophilic inner surface having a first surface temperature, and the vessel contains a hydrophobic surface spaced apart and separated from the hydrophilic inner surface so that the hydrophobic surface is not in contact with the hydrophilic surface, wherein the water at least partially contacts the hydrophilic inner surface and the hydrophobic surface, and wherein the hydrophobic surface has a second surface temperature less than the first surface temperature;

heating the hydrophilic surface so as to heat the water to saturation temperature at the surrounding conditions wherein the temperature difference between the first surface temperature and the saturation temperature is sufficient so that nucleation on the hydrophobic surface occurs to produce a vapor from the liquid such that the water in the vessel increases in concentration of salt; and condensing the vapor to produce a desalinated water, which is lower in concentration of salt than the water introduced into the vessel.

19. The method of claim 18, wherein the step of condensing the vapor comprises introducing the water vapor to a condensing surface at a third surface temperature, which is less than the saturation temperature.

20. The method of claim 19, wherein the condensing surface is a heterogeneous surface having at least one hydrophilic region and at least one hydrophobic region.

* * * * *